United States Patent [19]

Mercer et al.

[11] 4,301,195

[45] Nov. 17, 1981

[54] TRANSPARENT SHEET MATERIAL

[75] Inventors: Elizabeth A. Mercer; John F. Eisele, both of St. Paul, Minn.

[73] Assignee: Minnesota Mining and Manufacturing Company, St. Paul, Minn.

[21] Appl. No.: 121,708

[22] Filed: Feb. 15, 1980

Related U.S. Application Data

[62] Division of Ser. No. 28,347, Apr. 9, 1979, Pat. No. 4,225,652.

[51] Int. Cl.³ .................. B05D 1/36; B32B 27/08
[52] U.S. Cl. .................. 427/261; 427/407.1; 427/407.2; 427/412.2; 427/412.3; 427/412.5; 428/426; 428/441; 428/515; 428/519; 428/480; 428/483; 525/333
[58] Field of Search .............. 428/483, 519, 522, 520, 428/426, 441, 480, 515; 525/333, 334, 336; 260/32.6 A, 96 R; 427/261, 407.1, 407.2, 412.2, 412.3, 412.5

[56] References Cited

U.S. PATENT DOCUMENTS 3,661,874  5/1972  Olson .................. 525/333
4,038,449  7/1977  Uemura et al. ........ 428/519 X

*Primary Examiner*—Thomas J. Herbert, Jr.
*Attorney, Agent, or Firm*—Cruzan Alexander; Donald M. Sell; James V. Lilly

[57]  ABSTRACT

Transparent sheet material comprising a transparent backing having an ink-receptive stratum thereon. The ink-receptive stratum comprises either a mixture of two polymers or individual layers of each polymer. One polymer is the reaction product of an epoxidized, water-insoluble, neutral rubbery polymer and a water-soluble secondary mono amine and the second polymer contains the repeating units

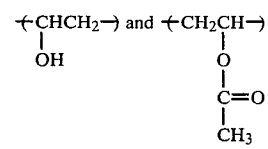

10 Claims, 2 Drawing Figures

TRANSPARENT SHEET MATERIAL

This is a division of application Ser. No. 28,347 filed Apr. 9, 1979, U.S. Pat. No. 4,225,652.

BACKGROUND OF THE INVENTION

This invention relates to transparent sheet materials. More particularly it relates to transparent sheet materials which have an ink-receptive stratum thereon.

Transparent sheet materials are commonly employed to prepare "visual transparencies." Such transparencies are utilized to project graphic images onto a viewing surface such as a screen or a wall.

One technique for preparing transparencies involves depositing an ink composition on the sheet material in image areas. This technique is especially useful when it is desired to automatically print information stored in data banks or other memory devices and utilizing devices such as computer graphic plotters.

The applicator pens used to deposit the ink compositions are frequently exposed to air for extended periods of time. Consequently, the ink compositions utilize solvents of low volatility (e.g., water, formamide, ethylene glycol monoethyl ether, etc.) to retard drying of the pen tips.

Several drawbacks exist with respect to the transparent films presently utilized to prepare visual transparencies. For example, many of the films do no accept inks (i.e., the ink composition balls up on the film surface). Those films that do accept the ink do not permit it to dry quickly but rather require extended period of time (e.g., 3 minutes or more) before the ink dries thereon. This greatly increases the opportunity for the image to be smeared and significantly reduces the plotter's speed. Still further, many of the films presently utilized show fingerprints badly. This greatly detracts from the esthetic quality of the final transparencies and makes the projected image less well defined.

The present invention, however, represents a dramatic improvement over the prior art. It provides transparent sheet materials which readily accept a wide variety of ink compositions (even those that employ low volatility solvents such as water, formamide and ethylene glycol monoethyl ether) and permits the ink compositions to dry quickly. Thus the sheet materials of the invention permit the ink to dry in 30 seconds or less and preferably in 10 seconds or less. Consequently, transparencies made from the film structure of the invention can be handled and stored in stacks almost immediately after preparation. Additionally the sheet materials of the invention exhibit improved resistance to fingerprinting. Still further the images produced on the sheet materials of the invention are strong in color and have excellent edge acuity. The preferred sheet materials of the present invention also exhibit good room temperature shelf stability. That is, they are not significantly affected by storage under such conditions.

SUMMARY OF THE INVENTION

In accordance with the present invention there is provided a sheet material useful in preparing visual transparencies comprising (a) a thin backing which is transparent to visible light; and (b) a continuous ink-receptive stratum on one major surface of said backing which is transparent to visible light and is selected from (i) a mixture comprising from about 30% to 70% by weight of a first polymer and from about 70% to 30% by weight of a second polymer, and (ii) a continuous layer on said backing of said first polymer and a continuous layer on said layer of said first polymer of said second polymer wherein said first polymer is water-soluble, rubbery, alkaline in aqueous solution and consists essentially of the reaction product of a water-soluble secondary mono amine and an epoxidized water-insoluble, neutral, rubbery polymer selected from cis-1,4-polybutadiene, butadiene:styrene copolymer, butadiene:acrylonitrile copolymer and cis-1,4-polyisoprene, and wherein said second polymer has a weight average molecular weight of at least about 50,000 and contains the repeating units

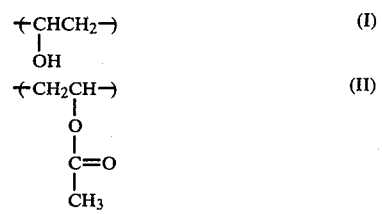

Thus, the ink-receptive stratum comprises either a mixture of the two polymers applied as a continuous layer to the backing material or an individual layer of each polymer. Preferably the ink-receptive stratum comprises a mixture of the two polymers applied as a single layer to the backing. Additionally, it is preferred that the mixture comprise from about 50% to 70% by weight of the first polymer and from about 50% to 30% by weight of the second polymer. Most preferably the ink-receptive stratum comprises about 65% by weight of the first polymer and about 35% by weight of the second polymer.

BRIEF DESCRIPTION OF THE DRAWINGS

The invention will be described in more detail hereinafter with reference to the accompanying drawings for in like reference characters refer to the same parts throughout the several views and in which.

DETAILED DESCRIPTION OF THE INVENTION

Figure 1:
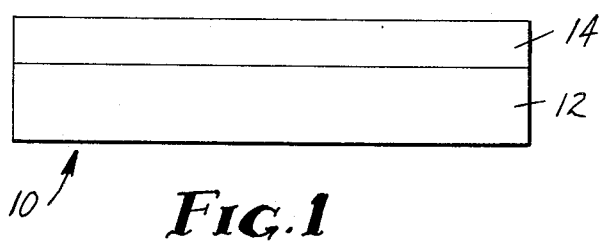
FIG. 1 is a side view of a preferred embodiment of the sheet material of the invention.

Referring now specifically to the drawings, FIG. 1 shows a preferred embodiment of the invention. Thus, sheet material 10 comprises a thin backing 12 which is transparent to visible light and a continuous ink-receptive stratum 14 on one major surface of backing 12. Stratum 14 comprises from about 30% to 70% by weight of the first polymer and from about 70% to 30% by weight of the second polymer.

Figure 2:
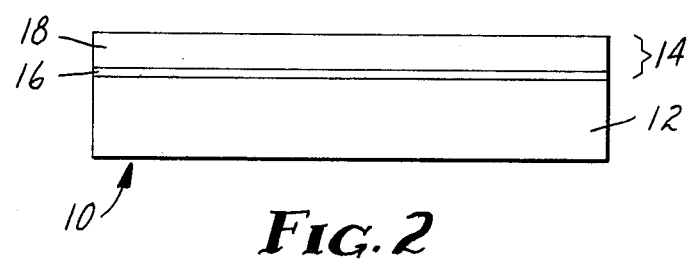
FIG. 2 is a side view of another embodiment of the sheet material of the invention.

FIG. 2 shows an alternative embodiment of the present invention. In this embodiment sheet material 10 comprises transparent backing 12 and a two layer ink-receptive stratum 14. The ink-receptive stratum 14 in FIG. 2 comprises a continuous layer 16 of the first polymer on backing 12 and a continuous layer 18 of the second polymer on the first polymer.

A variety of materials are useful as backing 12 in the present invention. These materials are transparent to visible light and are preferably thin and flexible. Representative examples of useful materials include glass, polyolefin film (e.g., polyethylene, polystyrene, polypropylene), acetate film (e.g., triacetate film base), etc. Preferably the substrate is polyester film (e.g., poly(ethylene terephthalate)).

The first polymer useful in ink-receptive stratum 14 is water-soluble, rubbery and alkaline in aqueous solution. It comprises an aminized, epoxidized diene-containing material (sometimes referred to hereinafter as AED).

The AED is known and its preparation is described in U.S. Pat. No. 3,661,874 incorporated herein by reference. Thus, a relatively simple two-step reaction in which a number of the diene bonds of the rubbery polymer are converted to epoxy groups, and the epoxy groups are subsequently aminized by reaction with a secondary mono-amine may be used in the preparation of the AED.

Epoxidation may be carried out by contacting the rubbery polymer with an acidic ion-exchange resin and acetic acid with the slow addition of hydrogen peroxide. Typically these ingredients are heated to about 60° C. for a short period of time.

The resultant epoxidized rubbery polymer may be converted to the water-soluble polymer by dissolving the polymer in a solvent such as 1,4-dioxane. The solution is typically then heated to about 60° C. and contacted with a solution of the water-soluble secondary mono amine in order to aminize the epoxidized rubbery polymer.

Rubbery polymers useful in preparing the AED include cis-1,4-polybutadiene; butadiene:styrene copolymer (such as GR-S type 1011 from Shell Chemical Company, 76.5:23.5 butadiene: styrene); butadiene:acrylonitrile copolymer (such as Hycar® 1014 from Goodyear Chemical Company, 80:20 butadiene:acrylonitrile); and cis-1,4-polyisoprene. A particularly preferred rubbery polymer is cis-1,4-polybutadiene.

Secondary mono amines useful in aminizing the epoxidized diene groups include dimethylamine, diethylamine, diethanolamine, di-n-propylamine di-n-butylamine, di-n-pentylamine, methylbenzylamine, methyl cyclohexylamine, N-methylamine, N-methylcyclohexylamine, 2-ethylaminoethanol, morpholine, 2,6-dimethyl morpholine, piperidine, 1-methyl piperazine and pyrrolidine. A particularly preferred secondary amine is dimethylamine. Other secondary monoamines are also known and may be employed to aminize the epoxidized rubbery polymer.

The second polymer useful in the ink-receptive stratum comprises a polyvinyl alcohol (sometimes referred to hereinafter as PVA). This material may be prepared by reacting polyvinyl-acetate with methanol in the presence of sulfuric acid. The resulting polymer contains the type I and type II units set forth above.

PVA useful in the present invention has a weight average molecular weight of at least about 50,000 and preferably of at least about 100,000. Most preferably it has a weight average molecular weight of at least about 125,000. Additionally the weight ratio of type I to type II units in the PVA is in the range of about 2:1 to 6:1. Preferably the weight ratio of type I to type II units is in the range of 3:1 to 4:1.

Representative examples of PVA useful in the invention include Gelvatol® 20-90 (20-25% residual polyvinyl acetate, 88.7-85.5% hydrolyzed, 125,000 weight average molecular weight); Gelvatol® 20-60 (20-25% residual polyvinyl acetate, 88.7-85.5% hydrolyzed, 96,000 weight average molecular weight); and Vinol® 540 (20-25% residual acetate, weight average molecular weight of approximately 100,000). The Gelvatol® polymers are commercially available from the Monsanto Chemical Company. The Vinol® polymer is available from Air Products and Chemicals, Incorporated.

The film structures of the invention may be easily prepared by, for example, known processing techniques. Thus, when the ink-receptive stratum comprises a mixture of the first and second polymers, separate solutions of the AED and the PVA may be blended together and then applied (e.g., by roll coating, curtain coating, mayer bar coating, etc.) onto the backing followed by drying at 120° C.-130° C. for a short time (e.g., two minutes).

When the ink-receptive stratum comprises separate layers of the first and second polymers, each layer may be applied by conventional coating techniques. After each layer is applied it is preferably dried at 120° C.-130° C. for a short time (e.g., two minutes).

In either case, the AED is preferably dissolved in methanol while the PVA is preferably dissolved in water (most preferably in distilled water) prior to blending. The concentration of AED and PVA in each solution may be varied if desired. Preferably the AED and PVA each comprise from about 4-6% by weight of the respective solutions. It is also preferred that the coating solutions be applied within 24 hours of their preparation.

Other ingredients may be added to the coating solutions. Thus, for example small amounts of surfactants (e.g., 0.05% by weight) may be employed to assist in the coating process. Other known surfactants may be employed if desired. A particularly useful surfactant is the reaction product of t-octylphenol with ethylene oxide, a nonionic surfactant available from Rhom & Haas as Triton® X-100.

Other layers may be employed with the film structures of the present invention. Thus, for example, adhesion-promoting layers may be utilized between the substrate and the ink-receptive stratum. A variety of materials may be employed as the adhesion promoting layer. A particularly useful class of such materials includes the Vitel® polyester resins available from Goodyear Chemicals. A particularly useful Vitel® resin is PE-200 (1.25 specific gravity, 67° C. $T_g$, 155° C. ring and ball softening point).

The present invention is further described in the accompanying examples. In these examples ink receptivity was determined by marking the various film structures with ink pens available from Hewlett-Packard. These pens employed ethylene glycol monoethyl ether as the solvent. The time required for the ink compositions to dry was the time required for a mark made from the pen to not smear when rubbed with light finger pressure.

Resistance to fingerprinting was also determined for each of the film structures. This was determined by inspecting the films for visible fingerprints after they had been handled by several people.

The AED employed in the several examples was prepared according to the following procedure. A 9.3% solution of cis-1,4-polybutadiene rubber (241.5 g Ameripol® CB 220, Goodrich-Gulf Chemical Company) in toluene was epoxidized to an epoxy equivalent weight of 131 by admixture with 4.1 g of formic acid and slow addition of 35% hydrogen peroxide at 63° C. The epoxidized polybutadiene solution was then aminized to a water-soluble polymer by heating the solution to 67° C. and adding 125 grams of a 24% by weight solution of dimethylamine in methanol over about a 1 hour period. A creamy yellow solution resulted. The solution was stirred and kept at 67° C. until a small, dried sample of the polymer could be dissolved in water. Methanol was then added to the solution and the solvents removed by vacuum stripping. Vacuum stripping was continued until a clear amber solution with a solids content of about 35% resulted. The solution was then diluted to 6% by weight by the addition of methanol.

The PVA solution employed in the examples was prepared by dissolving 0.12 g Triton ® X-100 and 6 g of Gelvatol ® 20-90 in 94 g of distilled water at 60° C.-70° C. The ingredients were agitated for about 30 minutes during dissolution.

Varying amounts of the AED and PVA solutions were combined to provide final coating solutions for examples 1-12. The ratio of AED to PVA was varied by adjusting the amount of each solution employed in the final coating solution.

EXAMPLES 1-11

Transparent sheet materials were prepared which comprised a transparent backing of biaxially oriented and heat set poly(ethylene terephthalate) film (100 microns thick) and an ink-receptive stratum. The ink-receptive stratum of each example was coated onto the backing and dried at 120° C.-130° C. for two minutes to provide a dried coating weight of 3.2 g/m$^2$.

The resultant sheet materials were tested for ink receptivity and resistance to fingerprinting. The compositions of the ink-receptive strata and the drying times are recorded in Table 1.

TABLE 1

| EXAMPLE | INK-RECEPTIVE STRATUM (WGT %) | | DRYING TIME (Sec) |
|---|---|---|---|
| | AED | PVA | |
| 1 | 0 | 100 | 180 |
| 2 | 10 | 90 | 180 |
| 3 | 20 | 80 | 120 |
| 4 | 30 | 70 | 3 |
| 5 | 40 | 60 | 3 |
| 6 | 50 | 50 | 3 |
| 7 | 60 | 40 | 3 |
| 8 | 70 | 30 | 3 |
| 9 | 80 | 20 | 3 |
| 10 | 90 | 10 | 3 |
| 11 | 100 | 0 | 3 |

The sheet material of Example 1 did not accept ink well as demonstrated by the long drying time. Additionally the image produced was faint and had poor edge acuity.

The sheet materials of Examples 2 and 3 also failed to accept ink well as demonstrated by the long drying time.

The sheet materials of Examples 4 and 5 initially accepted ink well as demonstrated by the short drying time. They were also resistant to fingerprinting. However, after being stored at room temperature for two months the drying time increased to 180 seconds. Consequently, they are less preferred embodiments of the invention.

The sheet materials of Examples 6-8 represent examples of preferred embodiments of the invention. As can be seen from Table 1, each of these sheet materials accepted ink readily as demonstrated by the short drying time. Additionally, room temperature aging had little effect upon the time required to dry ink compositions applied to the sheet materials. Additionally, each of the sheet materials of Examples 6-8 were resistant to fingerprinting.

The sheet materials of Examples 9 and 10 accepted ink but were not resistant to fingerprinting. To the contrary, the ink-receptive strata of these examples was highly susceptible to fingerprinting.

EXAMPLE 12

Example 6 was repeated except that an adhesion-promoting layer was interposed between the poly(ethylene terephthalate) and the ink-receptive stratum. The adhesion promoting layer comprised a hard, resinous polyester resin having a specific gravity of 1.25, an acid number of greater than 5, $T_g$ of 67° C. and a ring and ball softening temperature of 155° C. The polyester is available as Vitel ® PE-200 from Goodyear Chemical Company. It was applied to the poly(ethylene terephthalate) from a 0.5% by weight solution in methyl ethyl ketone and toluene (50/50 by weight). The coated poly(ethylene terephthalate) was then dried at 75°-85° C. for 1 minute. The ink-receptive stratum was then applied as described in Example 6. The resultant sheet material accepted ink well. Thus, the ink dried in less than 5 seconds when applied to the ink-receptive stratum. Additionally the sheet material was resistant to fingerprinting.

EXAMPLE 13

A transparent sheet material according to the invention was prepared. A solution of PVA (Gelvatol ® 20-90) was prepared by dissolving 0.12 g Triton ® X-100 in 94 g distilled water at 60° C.-70° C. and then slowly adding the Gelvatol ® thereto. The mixture was then stirred for about ½ hour at 60°-70° C.

A sheet of biaxially oriented and heat-set poly(ethylene terephthalate) (100 microns thick) was first coated with a solution of AED (0.4% by weight in methanol) and dried at 120° C.-130° C. for 2 minutes to provide a dried coating weight of 0.11 g/m$^2$.

The coated sheet was then coated with the AED solution and dried at 120° C.-130° C. for 2 minutes to provide a dried coating weight of 3.2 gm/ft$^2$. The resultant sheet material had a two layer ink-receptive stratum.

The resultant sheet material accepted ink well. Thus, the ink dried in less than 5 seconds when applied to the PVA layer. Additionally the film structure was resistant to fingerprinting. After being stored at room temperature for two months the drying time increased to 180 seconds. Consequently this example represents a less preferred embodiment of the invention.

What is claimed is:

1. A process for forming an image on a transparent film structure which comprises the steps of
    providing a sheet material that comprises
    (a) a thin backing which is transparent to visible light; and
    (b) a continuous ink-receptive stratum on one major surface of said backing wherein said stratum is transparent to visible light and employs (i) a first polymer that is water-soluble, rubbery, alkaline in aqueous solutions and consists essentially of the reaction product of a water-soluble secondary mono amine and an epoxidized water-insoluble, neutral, rubbery polymer selected from cis-1,4-polybutadiene, butadiene:styrene copolymer, butadiene:acrylonitrile copolymer and cis-1,4-polyisoprene, and (ii) a second polymer that has a weight average molecular weight of at least about 50,000 and contains the repeating units

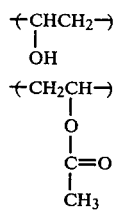

wherein the weight ratio of type I units to type II units in said second polymer is in the range of about 2:1 to 6:1; and wherein said ink-receptive stratum is selected from
  (A) a single layer comprising a mixture of from about 30% to 70% by weight of said first polymer and from about 70% to 30% by weight of said second polymer and
  (B) a multiple layer comprising a first continuous layer of said first polymer on said backing and a second continuous layer of said second polymer on said layer of first polymer contacting said ink-receptive stratum with an ink composition.

2. A process according to claim 1 wherein said ink-receptive stratum comprises said multiple layer.

3. A process according to claim 1 wherein said ink-receptive stratum is said mixture of said first polymer and said second polymer.

4. A film process according to claim 3 wherein an adhesion promoting layer is interposed between said backing and said ink-receptive stratum.

5. A process according to claim 3 wherein said mixture comprises from about 50% to 70% by weight of said first polymer and from about 50% to 30% by weight of said second polymer.

6. A process according to claim 5 wherein said mixture comprises about 65% by weight of said first polymer and about 35% by weight of said second polymer.

7. A process according to claim 1 wherein said first polymer consists essentially of the reaction product of a water-soluble secondary mono amine and cis-1,4-polybutadiene.

8. A process according to claim 7 wherein said secondary mono amine is dimethylamine.

9. A process according to claim 8 wherein the weight ratio of said type I units to said type II units in said second polymer is in the range of about 3:1 to 4:1.

10. A process according to claim 9 wherein the weight average molecular weight of said second polymer is about 125,000.

* * * * *